United States Patent [19]

Fredell et al.

[11] 3,837,232

[45] Sept. 24, 1974

[54] MAGNETIC SLIP CLUTCH

[75] Inventors: Gary D. Fredell; Gentiel M. DeGryse, both of East Moline, Ill.

[73] Assignee: Gulf & Western Industries, Inc., New York, N.Y.

[22] Filed: Aug. 29, 1973

[21] Appl. No.: 392,685

[52] U.S. Cl. .................... 74/142, 64/28 M
[51] Int. Cl. .................... F16h 27/02, F16d 7/02
[58] Field of Search .................... 74/142; 64/28 M; 192/84 PM

[56] References Cited
UNITED STATES PATENTS

| | | | |
|---|---|---|---|
| 2,601,961 | 7/1952 | Stephenson | 64/28 M X |
| 2,642,740 | 6/1953 | Stephenson et al. | 64/28 M |
| 2,746,305 | 5/1956 | Wagner | 74/142 X |
| 3,175,408 | 3/1965 | Martin | 74/142 |

Primary Examiner—Allan D. Herrmann
Attorney, Agent, or Firm—Meyer, Tilberry & Body

[57] ABSTRACT

A permanent magnet slip clutch is disclosed for providing slippage at a predetermined torque transmission between driving and driven members. The clutch is comprised of abutting, axially aligned input and output components each comprised of concentric rings of magnetic material and a permanent magnet ring therebetween. The concentric rings are oppositely polarized by the permanent magnet, and the outer and inner rings of the input and output components are oppositely polarized, whereby the abutting end faces of the corresponding rings of the two components are attracted to one another. The magnetic attraction provides for relative rotational slippage between the input and output components when the torque transmitted therebetween overcomes the force of attraction.

11 Claims, 6 Drawing Figures

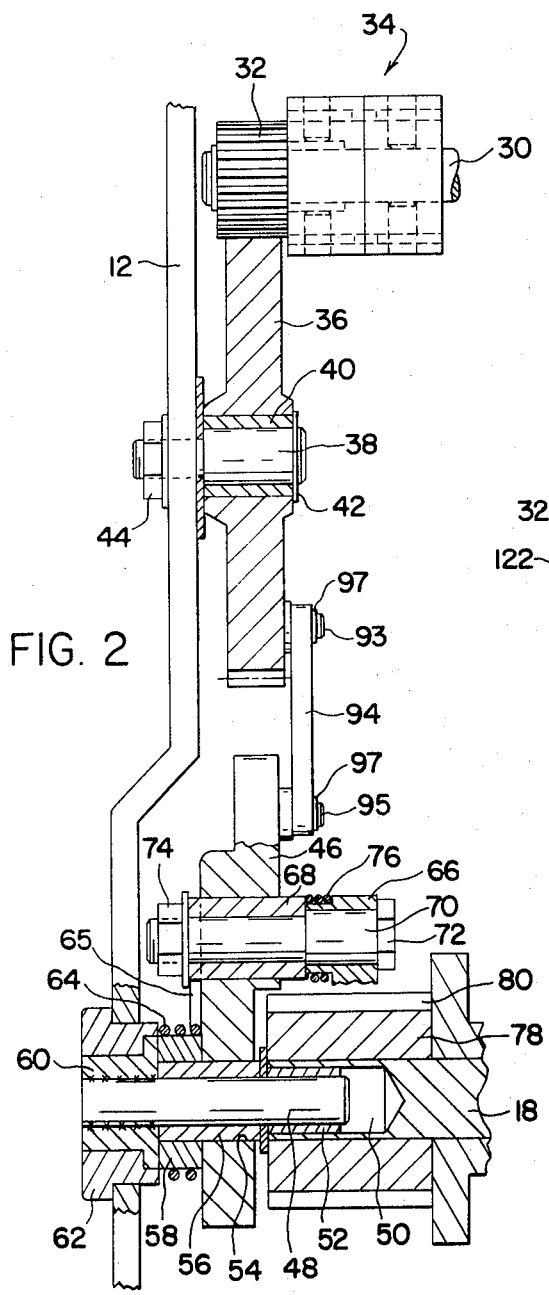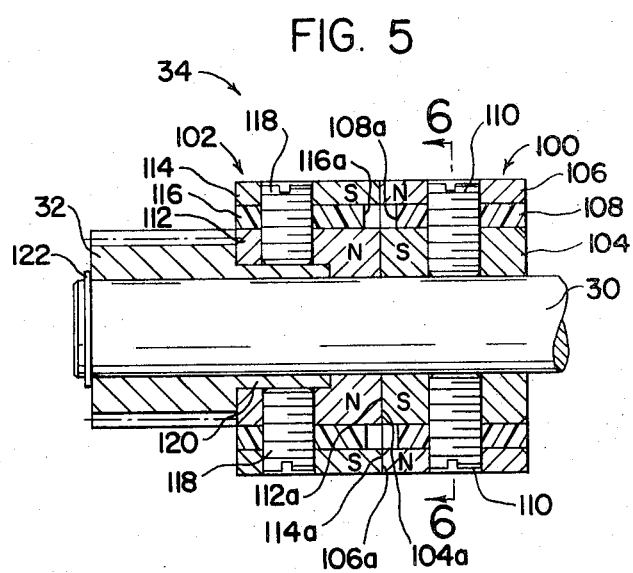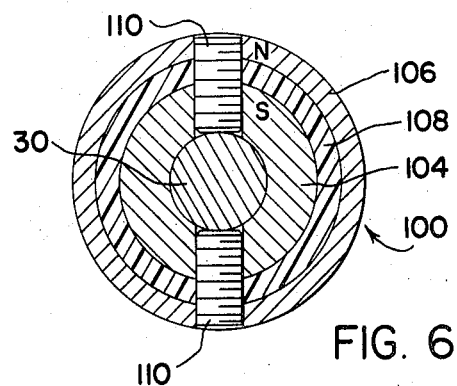

MAGNETIC SLIP CLUTCH

This invention relates to the art of clutches and, more particularly, to permanent magnet slip clutches.

Slip clutches have been provided heretofore for the purpose of achieving slippage between driving and driven components when the torque transmitted therebetween reaches a predetermined level. Such previous clutch arrangements have included the use of a plurality of friction discs pressed axially together by force applying means such as springs. Other arrangements employed heretofore include the use of a spring component rigidly fixed to an input drum and frictionally associated with an output drum to slip relative thereto when a predetermined torque is applied to the output drum. In addition to such mechanical arrangements, electromagnetic clutches have also been employed to provide slippage between input and output components.

Several disadvantages are attendant to the mechanical and electromagnetic slip clutch arrangements heretofore provided. In this respect, friction disc and spring arrangements are subject to physical wear during use which decreases the capability thereof to provide for slippage at a desired torque level. More particularly, as the components of these arrangements wear, slippage occurs at a progressively lower level. Accordingly, frequent adjustment or replacement of parts is required. With electromagnetic slip clutches, an external source of excitation must be provided to obtain the magnetic field for energization of the clutch assembly. This, of course, requires the provision of appropriate electrical connections to the clutch assembly which, together with the provision of an external source of excitation often results in an undesirable complex assembly. Moreover, the level of excitation can vary, whereby slippage can occur at torque levels other than the desired level.

In accordance with the present invention, the foregoing disadvantages, and others, of slip clutches heretofore known are overcome. More particularly, the slip clutch of the present invention advantageously provides a substantially constant magnetic force between the driving and driven components, whereby slippage is achieved at a substantially constant torque level. Further, the magnetic force is completely internal, whereby external excitation is not required, and physical wear of the clutch components is constant in that the magnetic force between the components is constant with respect to time.

More particularly, the clutch assembly of the present invention employs permanent magnetic components the magnetization of which is relatively uneffected by lubrication, heat and time, whereby the useful life of the clutch assembly is maximized. The torque capacity of the clutch is adapted to be varied by varying the relative sizes of the components thereof, whereby the clutch is applicable to use with arrangements of driving and driven components requiring slippage at different torque levels.

In accordance with one aspect of the present invention, the clutch is comprised of input and output components of magnetic material and at least one of which includes a pair of concentric elements of magnetic material having a permanent magnet ring disposed therebetween. The input component is mounted on an input member such as a drive shaft, and the output component is suitably supported for rotation relative to the input component. Preferably, both components include concentric elements of magnetic material, and the corresponding outer and inner elements of the two components are axially aligned with the inner end faces of the elements disposed in abutting relationship.

The magnet ring of one of the components oppositely polarizes the concentric elements of the corresponding component. For example, the magnet ring includes North and South polarizations in the outer and inner elements, respectively. The magnet ring of the other component polarizes the corresponding concentric elements for the outer and inner elements to have South and North polarization, respectively. Accordingly, when the inner end faces of the concentric elements are disposed in abutting relationship the elements are attracted to one another. When the torque transmitted between the input and output components overcomes the force of attraction, the two components will slip relative to one another. By varying the radial dimensions of the abutting end faces of the two components, the torque level at which slippage occurs can be varied.

The slip clutch of the present invention will be described in detail hereinafter in conjunction with a traffic signal controller of the character employed in traffic control systems to operate traffic signals in accordance with a desired program. In such a controller, the slip clutch is employed to provide for slippage between the drive shaft of a motor and a pinion driven by the motor and which in turn drives a segment gear by which stepped advancement of a switch actuating cam drum of the controller is achieved. Although the clutch is described in conjunction with such a traffic signal controller, it will be readily apparent to those skilled in the art that the clutch is adapted for use in conjunction with other drive arrangements where slippage between driving and driven members is desired.

Accordingly, it is an outstanding object of the present invention to provide a magnetic slip clutch which requires no external excitation to obtain a magnetic field between relatively rotatable components thereof.

Another object is the provision of a slip clutch of the foregoing character in which the magnetic force between the components of the clutch is constant with respect to time whereby physical wear of the clutch components is constant.

Still another object is the provision of a magnetic clutch of the foregoing character in which magnetization of the components is permanent and is relatively uneffected by time, heat and lubrication.

Yet another object is the provision of a slip clutch of the foregoing character in which the torque capacity of the clutch can be varied by varying the areas of surface contact between the components.

Still another object is the provision of a slip clutch of the foregoing character which is economical to produce and which is comprised of a minimum number of parts which are adapted to be readily assembled to provide the clutch components.

The foregoing objects, and others, will in part be obvious and in part more fully pointed out hereinafter in conjunction with the description of the accompanying drawing in which:

FIG. 2 is an enlarged plan view, in section, of a portion of the mechanism illustrated in FIG. 1;

FIG. 5 is a detailed view, in section, of a preferred magnetic slip clutch arrangement in accordance with the present invention; and, FIG. 6 is a view in cross section of the slip clutch arrangement illustrated in FIG. 5, the section being along line 6—6 in FIG. 5.

Figure 1:
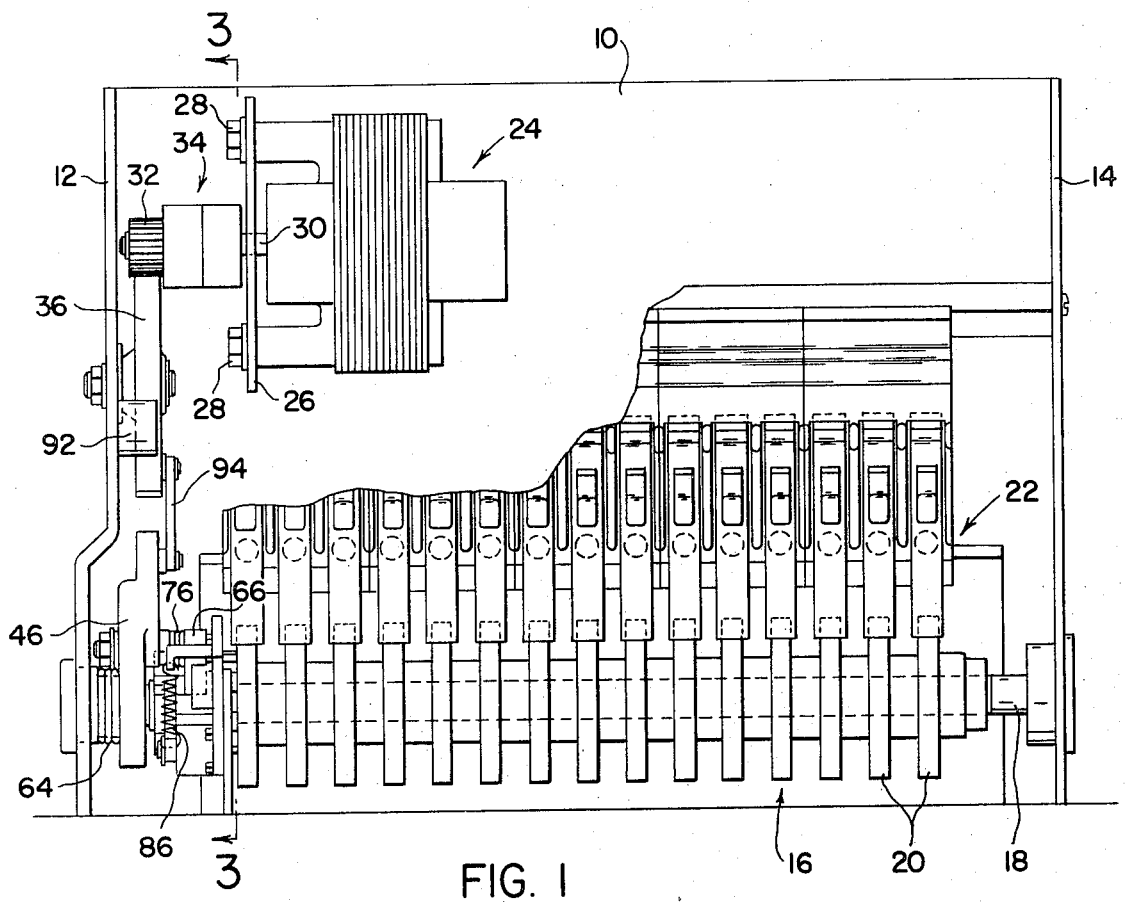
FIG. 1 is a plan view of a cam drum stepping mechanism of a traffic signal controller.
Figure 3:
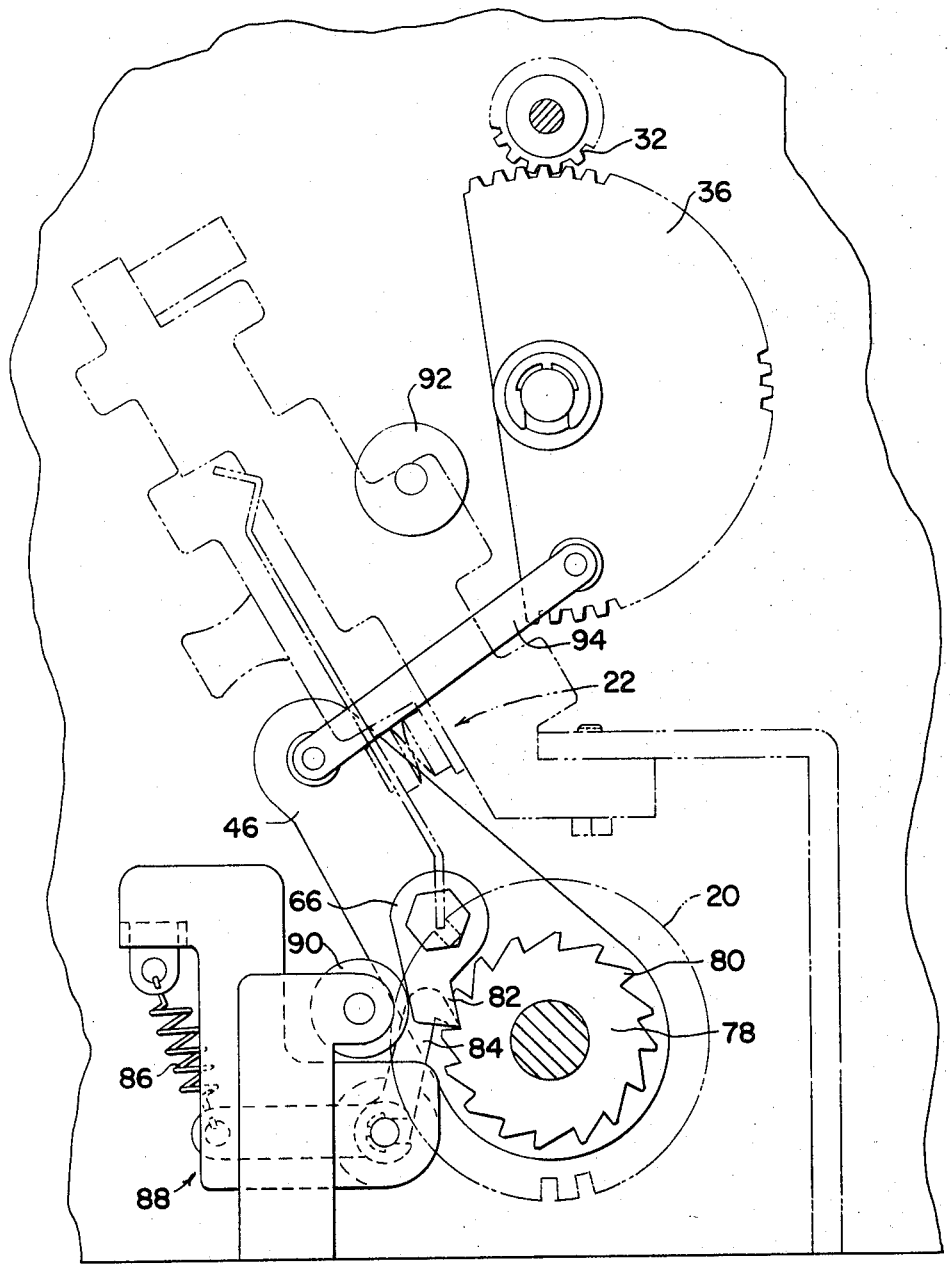
FIG. 3 is a sectional elevation view taken along line 3—3 in FIG. 1.

Referring now in greater detail to the drawings wherein the showings are for the purpose of illustrating a preferred embodiment of the invention only and not for the purpose of limiting the invention, a cam drum stepping mechanism for a traffic signal controller is illustrated in FIGS. 1–3 which includes a base plate 10 and a pair of generally parallel spaced apart support plates 12 and 14 extending upwardly from the base plate. Support plates 12 and 14 may be integral with base plate 10 or may be separate components suitably interconnected with the base plate such as by welding or through the use of threaded fasteners or the like. The mechanism further includes a cam drum assembly 16 comprised of a camshaft 18 carrying a plurality of cam members 20 which are suitably mounted on the shaft for rotation therewith. In a manner well known, cam members 20 are operatively associated with corresponding make-break contacts 22 so that the latter are actuated in response to rotation of the cam drum. Cam drum 16 extends between support plates 12 and 14 and has the corresponding ends of shaft 18 suitably supported thereby for rotation of the cam drum relative thereto.

Cam drum 16 is adapted to be rotated step-by-step in a given direction by means of a motor driven ratchet and pawl assembly operatively associated with the cam drum at one of the ends thereof. More particularly, in the embodiment illustrated, the motor driven ratchet and pawl assembly includes an electric drive motor 24 mounted on a support plate 26 by means of bolts or the like 28 extending through plate 26 and into the motor housing. While not illustrated in detail, it will be appreciated that support plate 26 for the motor can be suitably interconnected with base plate 10 and/or support plate 12 to support the motor in a desired position relative to the cam drum. Motor 24 includes a drive shaft 30, and the motor is adapted to rotate pinion gear 32 through a slip clutch mechanism 34 which is described in greater detail hereinafter. The teeth of pinion 32 are in meshing engagement with the teeth of a gear segment 36 which is mounted on support plate 12 for rotation relative thereto. More particularly, gear 36 is mounted on a gear shaft 38 which is provided with a sleeve bearing 40. One end of shaft 38 is provided with a suitable retaining ring 42 for gear 36, and the other end of the shaft extends through an opening in support plate 12 and is provided with a threaded shank adapted to receive threaded nut 44, whereby the shaft and gear are removably mounted on support plate 12.

The motor driven ratchet and pawl assembly further includes an oscillatable ratchet arm 46 having a pivot axis coaxial with the axis of cam drum shaft 18. In this respect, support plate 12 carries a stub shaft 48 which projects inwardly from support plate 12 and has its inner end disposed in an axial opening 50 in camshaft 18. The camshaft is supported for rotation relative to stub shaft 48 by means of a sleeve bearing 52 interposed between shaft 48 and recess 50. Pawl arm 46 is provided with an opening 54, and a bearing sleeve 56 is disposed in opening 54 and surrounds shaft 48, whereby pawl arm 46 is supported for pivotal movement relative to shaft 48 and independent of the rotatable support of camshaft 18. A positioning sleeve 58 surrounds bearing sleeve 56 and is interposed between pawl arm 46 and sleeve 60 which is suitably secured to shaft 48 and is disposed in bearing block 62 mounted in an opening therefor in support plate 12. A biasing spring 64 surrounds sleeve 58 and has an end 65 engaged behind a pawl member 66 on arm 46 so that the arm is biased in a given direction, as explained more fully hereinafter. It will be appreciated that the other end of spring 64, not illustrated, is secured against movement when arm 46 pivots opposite the given direction so that the spring stores energy to bias the arm in the given direction.

Pawl member 66 is mounted on pawl arm 46 for movement therewith and pivotal movement relative thereto. In this respect, pawl arm 46 is provided with an opening in which a support sleeve 68 is fixedly mounted to receive and support a removable pawl member shaft 70. Shaft 70 has a head 72 at one end and a threaded shank at its opposite end adapted to receive a nut 74 by which the shaft is removably secured within sleeve 68. Pawl member 66 surrounds shaft 70 at the headed end thereof and is pivotal relative to the shaft. A biasing spring 76 surrounds the pawl member and is operatively associated therewith and with arm 46 in a well known manner to bias the pawl member to pivot in a desired direction relative to the arm, as described hereinafter.

A ratchet member 78 is suitably mounted on camshaft 18 for rotation therewith. Ratchet member 78 has teeth 80, and pawl member 66 has a nose portion 82 cooperable with ratchet teeth 80 to advance the cam drum in response to operation of the motor driven ratchet and pawl mechanism. A pivotal, spring biased holding finger 84 is mounted on base plate 10 to engage ratchet teeth 80 to prevent rotation of the cam drum in the direction opposite to the stepping direction. A spring 86 biases holding finger 84 into engagement with the ratchet teeth. The holding finger is suitably mounted on a bracket assembly 88 which is provided with a stop member 90 to engage and limit pivotal movement of pawl arm 46 in the direction of stepping movement of the cam drum. Support plate 12 is provided with a stop member 92 which is mounted thereon in a position to engage gear segment 36 to limit movement of the latter in the direction which results in movement of pawl arm 46 in the direction opposite the stepping direction. A link element 94 pivotally interconnects pawl arm 46 and gear segment 36. Any suitable connection can be employed and, in the embodiment illustrated link 94 has its opposite ends apertured to receive a pin 93 integral with gear 36 adjacent the outer periphery thereof and a pin 95 integral with the outer end of arm 46. Suitable fasteners, such as split rings 97, can be attached to pins 93 and 95 to retain the link thereon.

Figure 4:
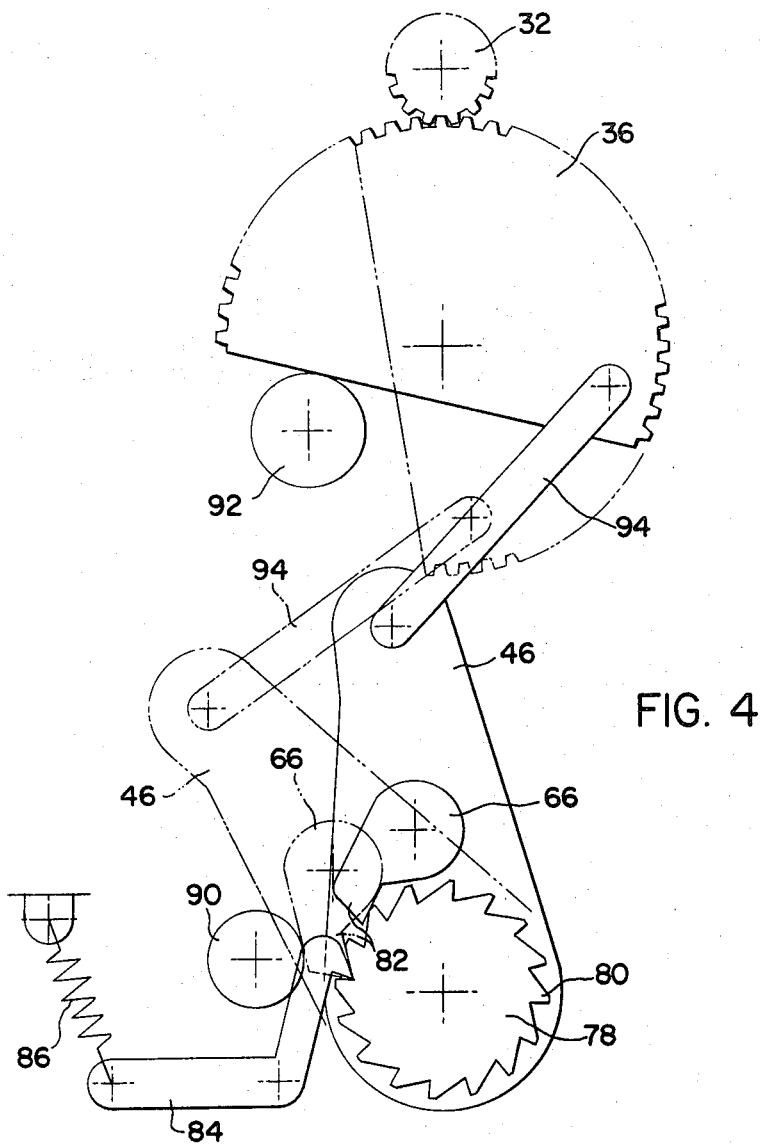
FIG. 4 is a schematic end elevation view illustrating the positions of components of the mechanism during operation thereof.

Prior to a stepping operation the component parts of the mechanism are in the positions thereof illustrated in FIG. 3, which positions correspond to the broken line positions of the components illustrated schematically in FIG. 4. When motor 24 is energized to achieve a stepping operation, pinion 32 is rotated to pivot gear segment 36 counterclockwise from the position illustrated in FIG. 3 to the solid position illustrated in FIG. 4. This degree of rotation of gear 36 corresponds to the necessary movement of pawl 66 relative to ratchet 78 to position pawl nose 82 relative to ratchet teeth 80 to achieve a desired degree of rotation of the cam drum during the stepping operation. When the component parts reach the position illustrated by solid lines in FIG. 4, gear 36 engages stop 92 whereby further pivotal movement of gear 36 and thus pawl arm 46 is precluded. During movement of gear 36 towards engagement with stop 92, spring 64 associated with pawl arm 46 is wound up to store a return biasing force for arm 46, and pawl 66 is displaced relative to teeth 80 of ratchet wheel 78 so that it will engage a tooth of the ratchet wheel and advance the cam drum in response to return movement of pawl arm 46. Pawl spring 76 biases nose 82 toward the ratchet wheel to assure engagement of the nose with the ratchet teeth.

When the component parts reach the position illustrated by solid lines in FIG. 4, motor 24 is still energized. Upon de-energization of the motor, spring 64 biases pawl arm 46 counter-clockwise with respect to FIGS. 3 and 4, whereby the pawl arm and gear segment 36 are returned to their initial position and pawl nose 82 engages behind a ratchet tooth to advance the cam drum. During return movement of the components, pinion 32 and motor shaft 30 freewheel as a result of de-energization of motor 24. When the components parts reach their initial positions, pawl member 66 engages fixed stop 90 to preclude further movement of the components in the return direction. Engagement of pawl member 66 with stop 90 prepares the components of the assembly for a subsequent stepping operation when motor 24 is again energized. Energization and de-energization of motor 24 is achieved in accordance with a time program and associated circuitry of the traffic controller, not illustrated.

When gear segment 36 engages fixed stop 92, and when ratchet member 66 engages fixed stop 90, it will be appreciated that considerable stress is imposed on the pinion and gear segment as well as on the motor shaft and other components of the assembly as a result of the abrupt interruption of the movement of the components. In accordance with the present invention, the imposition of stress on the motor shaft and between the teeth of the pinion and gear segment is advantageously reduced by the provision of magnetic slip clutch assembly 34 between the motor shaft and pinion. A preferred embodiment of the magnetic clutch is illustrated in FIGS. 5 and 6 of the drawing.

In the preferred arrangement, the magnetic clutch assembly is comprised of an input clutch component 100 mounted on motor shaft 30 for rotation therewith, and an output clutch component 102 supported by shaft 30 for rotation relative thereto and relative to clutch component 100. As set forth more fully hereinafter, pinion 32 is interconnected and output component 102 is interconnected therewith relative to motor shaft 30. Clutch components 100 and 102 are magnetically attracted to one another, whereby pinion 32 is adapted to rotate with motor shaft 30 until the torsional load between pinion 32 and shaft 30 overcomes the magnetic force between the two clutch components. When the magnetic force is overcome, clutch components 100 and 102 rotate relative to one another, whereby motor shaft 30 can rotate relative to pinion 32.

In the embodiment disclosed, input clutch component 100 is comprised of inner and outer rings 104 and 106, respectively, of magnetic material such as steel. Rings 104 and 106 are concentric with respect to the axis of shaft 30 and are radially spaced apart to receive a permanent magnet ring 108 therebetween. Preferably, magnet ring 108 is a flexible permanently magnetized rubber material having radially opposite faces of different polarity. A suitable permanently magnetic material of this character is produced by Minnesota Minning and Manufacturing Company and is available under the trademark PLASTIFORM which is a registered trademark of the latter company. In the embodiment disclosed, magnet ring 108 is oriented relative to rings 104 and 106 so as to induce a South polarity in inner ring 104 and a North polarity in outer ring 106. The radial space between inner and outer rings 104 and 106 can be such as to snugly receive ring 108, and the three rings are provided with apertures to receive fasteners such as set screws 110 which are of non-magnetic material and by which the input clutch component is fastened to motor shaft 30 for rotation therewith. Fasteners 110, in addition to interconnecting the clutch component with motor shaft 30, serve to maintain rings 104, 106 and 108 in assembled relationship relative to one another. It will be appreciated, however, that the three rings may be otherwise interconnected against displacement relative to one another and that the input clutch component can be interconnected with the motor shaft other than by fasteners such as set screws.

Output clutch component 102 is, to a certain extent, structurally similar to input component 100. In this respect, output component 102 is comprised of inner and outer rings 112 and 114, respectively, of magnetic material such as steel. Rings 112 and 114 are concentric with respect to the axis of motor shaft 30 and are radially spaced apart to receive a permanent magnet ring 116 similar to permanent magnet ring 108. In this instance, however, permanent magnet ring 116 is oriented relative to inner and outer rings 112 and 114 such as to induce a North polarity in inner ring 112 and a South polarity in outer ring 114. As mentioned hereinabove, the permanent magnet material has opposite faces of different polarity, whereby the desired polarity for rings 112 and 114 is achieved by reversing the surface relationship of magnet ring 116 relative to the inner and outer rings.

In a manner similar to input component 100, rings 112, 114 and 116 of output component 102 are apertured to receive fasteners 118 of non-magnetic material for retaining the rings in assembled relationship and for interconnecting the output component with pinion 32. In this respect, it will be noted that the aperture through inner ring 112 for receiving motor shaft 30 is enlarged from the outer end thereof towards the inner end to receive a sleeve 120 of pinion 32. Fasteners 118 engage sleeve 120 to interconnect output component 102 with pinion 32 for rotation therewith. Pinion 32 and sleeve 120 thereof are, of course, apertured to loosely receive drive shaft 30 so as to be rotatable relative thereto. Preferably, the outer end of shaft 30 is slotted to receive a split retaining ring 122 to prevent unintentional axial displacement of output component 102 and pinion 32 from the drive shaft.

It will be seen that the magnetic orientation between the axially opposed inner and outer concentric rings of the two clutch components provides for the components to be magnetically attracted to one another. Preferably, the inner rings of the two components are of like radial dimension in the direction transverse to the axis of shaft 30 and, similarly, the outer rings of the two components are of like dimension in the same direction. Further, the inner end faces 104a and 106a of rings 104 and 106 preferably are coplanar, and the inner end faces 112a and 114a of rings 112 and 114 are coplanar. This relationship provides for the end faces of the two clutch components to have a maximum area of surface engagement therebetween. It will be appreciated, however, that the coplanar end face relationship as well as the transverse dimensional identity can be varied without departing from the relationship required to achieve magnetic attraction between the two components. The opposed end faces 108a and 116a of magnet rings 108 and 116 preferably are spaced axially inwardly of the inner end faces of the corresponding concentric rings to avoid engagement of the rubber ring material which would affect slippage between the input and output components.

It will be apparent from the foregoing description that rotation of motor shaft 30 and input clutch component 100 therewith is adapted to impart rotation to pinion 32 through output component 102, and that shaft 30 is adapted to rotate relative to pinion 32 when the latter is stopped or otherwise loaded to the extent that the torsional load between the pinion and drive shaft overcomes the force of magnetic attraction between components 100 and 102. The torsional load at which such slippage occurs can be varied in several different ways. For example, the areas of contact between the end faces of the ring components can be increased or decreased by changing the radial dimensions of the ring elements. Alternatively, the surfaces of the end faces can be machined to different degrees of finish to increase or decrease frictional engagement therebetween. Many modifications of the structure disclosed will be readily apparent to provide for achieving slippage at a desired torsional load between the components.

The foregoing slip clutch arrangement advantageously provides for slippage between pinion 32 and the drive motor shaft when gear segment 36 is moved to either of its limits of movement during a cam drum stepping operation. More particularly, when motor 24 is energized to rotate pinion 32 clockwise as viewed in FIGS. 3 and 4 to pivot gear segment 36 counterclockwise so that pawl arm 46 displaces pawl member 66 relative to ratchet gear 78, gear segment 36 engages fixed stop 92 prior to de-energization of the drive motor. Accordingly, the slip clutch arrangement allows the motor shaft to continue to rotate subsequent to engagement of gear segment 36 with stop 92. This advantageously reduces the shock on the motor shaft and between the teeth of the pinion and gear segment in response to the abrupt stopping of the gear segment, and allows the motor to continue to operate under a reduced load from that imposed thereon in the absence of a slip clutch arrangement. When the drive motor is de-energized, biasing spring 64 associated with ratchet arm 36 returns the ratchet arm and thus gear segment 36 to their initial dispositions and during this return movement pinion 32 and drive motor shaft 30 freewheel as a result of de-energization of the motor. When the components return to their initial position they are abruptly stopped by engagement of pawl member 66 with fixed stop 90. Motor shaft 30 has considerable momentum as a result of the return movement, and the slip clutch arrangement provides for the drive shaft to rotate relative to pinion 32 when the latter stops, thus to reduce the shock imposed on the teeth of the pinion and gear segment and which would otherwise be transmitted from the pinion to the motor shaft.

While considerable emphasis has been placed herein on a specific structural embodiment of the permanent magnet slip clutch and a specific arrangement thereof with respect to an input drive shaft and a driven output gear, it will be readily appreciated that many modifications of clutch structure as well as arrangements with respect to driving and driven structural members can be provided without departing from the principles of the present invention. For example, the driven pinion could readily be replaced by a pulley or by a shaft component coaxial with the motor drive shaft. Further, the driving relationship disclosed could be readily reversed for the pinion to define the driving member and shaft 30 the driven member, in which case, of course, the shaft would be other than a motor shaft. Many arrangements for combining the input and output clutch components to achieve slippage therebetween and thus relative rotation between driving and driven components are possible.

With regard to the clutch structure, it will be appreciated that the magnetic attraction between the input and output clutch components can be achieved other than by providing for both of the components to be defined by concentric rings of magnetic material and an interposed permanent magnet ring. In this respect, for example, one of the components could be defined by a solid body of magnetic material such as steel. The opposite polarity of the inner and outer rings of the other clutch component would thus provide for a magnetic field to be established between the latter rings and body of magnetic material to achieve the desired attraction therebetween for the components to cooperate as a clutch assembly. Still further, in a structure of the latter character or in a structure similar to that illustrated herein, the inner ring component or components of the assembly could readily be solid elements and could be integral with or otherwise connected to the corresponding driving input or driven output member, as opposed to being apertured rings mountable on a shaft member or the like which is separate therefrom.

Since many possible embodiments of the present invention may be made and since many possible changes may be made in the embodiments herein illustrated and described, it is to be distinctly understood that the foregoing descriptive matter is to be interpreted merely as illustrative of the present invention and not as a limitation.

What is claimed is:

1. A magnetic slip clutch comprising, input and output magnet means adapted to be supported for relative rotation about a common axis, one of said input and output magnet means including an inner member of magnetic material, a sleeve of magnetic material surrounding said inner member and a permanent magnet ring between said inner member and sleeve and inducing opposite polarity therebetween, said inner member and sleeve having corresponding end faces, and the other of said input and output magnet means having end face means juxtaposed and magnetically attracted to said end faces of said inner member and sleeve.

2. The clutch according to claim 1, wherein said permanent magnet ring is comprised of magnetized rubber.

3. The clutch according to claim 2, wherein said end faces of said inner member and sleeve are coplanar and the corresponding end face of said permanent magnet ring is spaced inwardly of said coplanar end faces.

4. The clutch according to claim 1, wherein said other of said input and output magnet means includes an inner member of magnetic material, a sleeve of magnetic material surrounding said inner member and a permanent magnet ring between said inner member and sleeve and inducing opposite polarity therebetween, said inner member and sleeve of said other magnet means having corresponding end faces defining said end face means, and said induced polarity in said inner member and sleeve of said other magnet means being opposite to the induced polarity of the corresponding inner member and sleeve of said one magnet means.

5. The clutch according to claim 4, wherein the end faces of said inner members and the end faces of said sleeves of said one and other magnet means are respectively of substantially the same dimensions transverse to said axis.

6. The clutch according to claim 5, wherein said corresponding end faces of said inner members and sleeves of each said one and other magnet means are coplanar.

7. The clutch according to claim 6, wherein said permanent magnet rings are each comprised of magnetized rubber and have end faces spaced inwardly from the coplanar end faces of the corresponding inner member and sleeve.

8. The clutch according to claim 1, wherein said inner member is a sleeve apertured to receive means for supporting said components for relative rotation.

9. The clutch according to claim 4, wherein the inner member of each of said one and other magnet means is a sleeve apertured to receive means for supporting said input and output magnet means for relative rotation.

10. A magnetic slip clutch mountable on drive shaft means and comprising, an input clutch component mountable on said shaft means for rotation therewith and including first inner and first outer concentric rings of magnetic material and a permanent magnet ring therebetween inducing opposite polarity in said first inner and outer rings, and an output clutch component mountable on said shaft means for rotation relative thereto and including second inner and second outer concentric rings of magnetic material and a permanent magnet ring therebetween inducing opposite polarity in said second inner and outer rings, said first and second inner outer rings having end faces disposed in abutting relationship when mounted on said shaft means and the induced polarities of said first and second inner rings and of said first and second outer rings being opposite, whereby said input and output components are magnetically attracted to one another.

11. The clutch according to claim 10 in combination with, drive shaft means, a drive motor for rotating said drive shaft means, a pinion gear connected to said output clutch component for rotation therewith and drivable by said motor through said input and output clutch components, a gear segment pivotal about a pivot axis parallel to the axis of said drive shaft means, said gear segment having teeth in meshing engagement with said pinion, first and second means to stop said gear segment in circumferentially spaced locations relative to said pivot axis, said motor being operable through said pinion to pivot said gear segment in one direction to engage said first stop means, means for biasing said gear segment in the direction opposite said one direction to engage said second stop means, switch means, cam drum means supported for stepped rotation relative to said switch means and including cam means for actuating said switch means in response to stepped rotation, and ratchet and pawl means actuated in response to movement of said gear segment between said first and second stop means to step said cam drum means, said clutch providing for said drive shaft means to rotate relative to said pinion when said gear segment engages said first and second stop means.

* * * * *